(12) United States Patent
Furumoto

(10) Patent No.: US 8,167,362 B2
(45) Date of Patent: May 1, 2012

(54) VEHICULAR HOOD HINGE ARRANGEMENT STRUCTURE

(75) Inventor: Daisuke Furumoto, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 91 days.

(21) Appl. No.: 12/799,542

(22) Filed: Apr. 27, 2010

(65) Prior Publication Data

US 2010/0270829 A1  Oct. 28, 2010

(30) Foreign Application Priority Data

Apr. 27, 2009 (JP) ................................. 2009-107328

(51) Int. Cl.
B60J 7/00 (2006.01)

(52) U.S. Cl. .................................................. 296/193.1

(58) Field of Classification Search ............... 296/193.1, 296/187.09, 203.02, 187.04, 193.11, 192; 180/69.2, 274, 69.21
See application file for complete search history.

(56) References Cited

U.S. PATENT DOCUMENTS

| 3,153,258 | A | * | 10/1964 | Badura | 16/302 |
| 3,351,975 | A | * | 11/1967 | Goto | 16/288 |
| 3,643,755 | A | * | 2/1972 | Gionet et al. | 296/76 |
| 4,012,807 | A | * | 3/1977 | Kern | 180/69.2 |
| 4,078,840 | A | * | 3/1978 | Itoh | 296/192 |
| 4,580,315 | A | * | 4/1986 | Beckwith | 16/308 |
| 4,819,550 | A | * | 4/1989 | Ioka | 454/147 |
| 6,230,364 | B1 | * | 5/2001 | Cheal | 16/289 |
| 6,892,843 | B2 | * | 5/2005 | Schillaci et al. | 296/193.11 |
| 7,004,534 | B2 | * | 2/2006 | Yoshii et al. | 296/192 |
| 7,774,900 | B2 | * | 8/2010 | Shaw | 296/193.11 |
| 7,975,797 | B2 | * | 7/2011 | Yuasa et al. | 180/274 |
| 2011/0031056 | A1 | * | 2/2011 | Takahashi et al. | 180/274 |

FOREIGN PATENT DOCUMENTS

JP  1557512  6/2007

* cited by examiner

Primary Examiner — Kiran B. Patel
(74) Attorney, Agent, or Firm — Lerner, David, Littenberg, Krumholz & Mentlik, LLP

(57) ABSTRACT

In a vehicular hood hinge arrangement structure in which the rear end part of a front hood is pivotally supported on a vehicle body via a hood hinge attached to the top end surface of a dash side front member at the side of a cowl box adopting a hollow structure the upper side of which is open, the hood hinge is arranged on the outside in the vehicle width direction of a vertical surface extending in the vehicle longitudinal direction of a cowl side panel closing the side end of the cowl box and in front of a front surface of a side body outer panel (front pillar) erected almost vertically in the side part of a vehicle body.

5 Claims, 6 Drawing Sheets

FIG.8
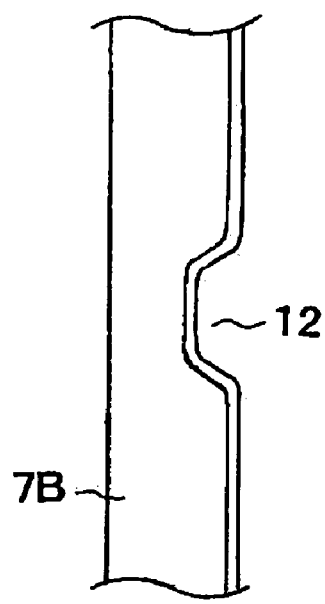
FIG.9A  FIG.9B  FIG.9C
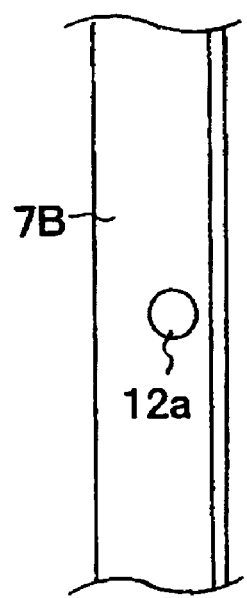 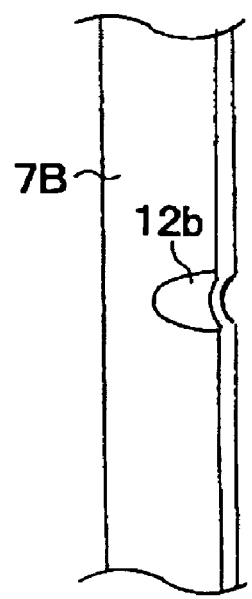 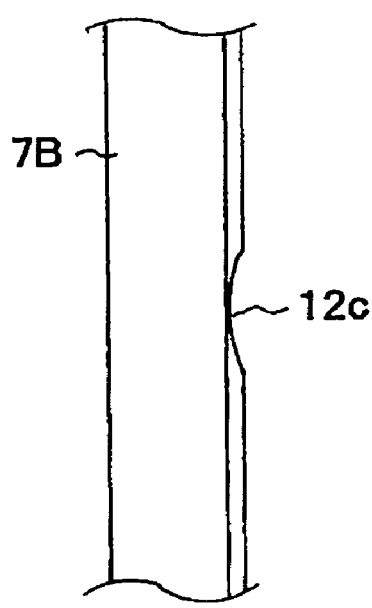

VEHICULAR HOOD HINGE ARRANGEMENT STRUCTURE

FIELD OF THE INVENTION

The present invention relates to an arrangement structure for a hood hinge pivotally supporting a vehicular front hood.

BACKGROUND OF THE INVENTION

In a vehicle provided with a rearward-hinged type front hood in the front part of the vehicle body, the rear end part of the front hood is pivotally supported on the vehicle body by a pair of right and left hood hinges. The hood hinge is made up of a hinge base fixed to the top end surface of a dash side front panel and a hinge arm, one end of which is fixed to the rear end part of the front hood and the other end of which is pivotally connected to the hinge base.

When a shock load is applied to the vehicle from the front, the front hood is pushed to the vehicle rear. Since a windshield glass is arranged in rear of the front hood, in order to prevent contact of the front hood with the windshield glass, the rearward movement of the front hood must be regulated so as to be within a fixed range.

On the other hand, from the viewpoint of protecting pedestrians, when a pedestrian is struck on the front hood, the front hood must deform properly to absorb the shock. Furthermore, the hood hinge pivotally supporting the front hood is sometimes formed so as to be relatively weak in such a manner as to be capable of being deformed easily.

As a means for regulating the rearward movement of the front hood, JP2007-137083A has disclosed a structure such that an engagement part (a hook and a receiving part) is formed on the hinge arm and the hinge base of the hood hinge so that when a shock is applied to the front hood from the front, the engagement of this engagement part regulates the rearward movement of the front hood.

In the above-described structure, unfortunately, in order to ensure the operation of the engagement part at the time of vehicle collision, a sufficiently large engagement part must be provided on the hood hinge. Even in this case, for example, when a shock load is applied to the vehicle from the slantwise front direction, the engagement part does not operate reliably, so that there is a fear that the rearward movement of the front hood is not controlled.

SUMMARY OF THE INVENTION

The present invention has been made in view of the above circumstances, and accordingly an object thereof is to provide a vehicular hood hinge arrangement structure capable of reliably regulating the rearward movement of a front hood and also capable of reliably absorbing a shock by means of the deformation of a hood hinge.

To achieve the above object, the invention according to a first aspect provides a vehicular hood hinge arrangement structure including a front hood; a pair of right and left hood hinges for pivotally supporting the rear end part of the front hood; a windshield glass arranged in rear of the front hood; right and left front pillars extending in the up and down direction at both sides of the windshield glass; a cowl box having a hollow structure the upper side of which is open, which extends in the vehicle width direction along the lower edge of the windshield glass under the rear end part of the front hood; right and left cowl side panels defining the side end parts in the vehicle width direction of the cowl box so as to close the side end parts; and right and left dash side front members provided at the sides of the cowl box, wherein each of the cowl side panels has a vertical surface extending above the dash side front member and extending in the vehicle longitudinal direction; each of the front pillars has a front surface, which extends upward almost vertically from the rear end part of the dash side front member, in the base part thereof; and each of the hood hinges is attached to the top end surface of the dash side front member so as to be located adjacent to the outside in the vehicle width direction of the vertical surface of the cowl side panel and in front of the front surface of the front pillar base part.

The invention according to a second aspect provides the vehicular hood hinge arrangement structure according to the first aspect, wherein the hood hinge comprises a hinge base and a hinge arm, the hinge base is fixed to the top end surface of a dash side front panel and has a rigidity higher than that of the hinge arm, and the hinge arm is pivotally connected to the center side in the vehicle width direction of the hinge base via a hinge axis, and the end part thereof extending to the opposite side to the hinge axis is connected to the rear end part of the front hood, thereby the hinge arm being arranged between the vertical surface of the cowl side panel and the hinge base.

The invention according to a third aspect provides the vehicular hood hinge arrangement structure according to the second aspect, wherein the hinge arm includes a vertical part extending downward from the hinge axis; a bent part bent in a U shape from the lower end of the vertical part toward the vehicle front; and a horizontal part extending horizontally from the bent part toward the vehicle front and attached to the rear end part of the front hood, the inflection point of the bent part being positioned below and in the rear of the hinge axis.

The invention according to a fourth aspect provides the vehicular hood hinge arrangement structure according to the third aspect, in which a weak part is formed in the bent part of the hinge arm.

The invention according to a fifth aspect provides the vehicular hood hinge arrangement structure according to the second aspect, in which a bead extending in the vehicle longitudinal direction is projectingly provided on the vertical surface of the cowl side panel.

According to the invention according to the first aspect, the hood hinge is arranged on the outside in the vehicle width direction of the cowl side panel; in other words, the cowl box is arranged between the paired right and left hood hinges. Therefore, when a shock is applied to the front hood from the vehicle front, the movement (deformation) of the hood hinge to the vehicle rear is guided by the vertical surface of the cowl side panel, and the movement in the right and left direction of the hood hinge is restricted. Thereby, the deformation direction of the hood hinge (hinge arm) is made definite, and the movement direction of the rear end part of the front hood can be stabilized.

Furthermore, by the configuration such that the hood hinge is arranged in front of the front surface of the front pillar base part, the hood hinge (hinge arm) that is moved (deformed) to the vehicle rear as described above strikes the front surface of the front pillar base part, so that the hood hinge (hinge arm) and the front hood can be reliably inhibited from moving further to the vehicle rear. Moreover, the movement of the hood hinge (hinge arm) and the front hood to the vehicle rear is regulated by the front surface of front pillar, not by an engagement structure of the hood hinge. Therefore, an engagement part need not be provided separately.

According to the invention according to the second aspect, the hinge base, which is arranged on both sides in the vehicle width direction of the hinge arm attached to the front hood, and the cowl side panel function as guide members for the hinge arm that is moved (deformed) to the vehicle rear by the shock applied from the vehicle front. Therefore, the movement in the right and left direction of the hinge arm is restricted further reliably, and the deformation (deformation toward the front surface of front pillar) of the hood hinge is made definite. By the collision of the hood hinge with the front surface of the front pillar base part, the hood hinge and the front hood can be reliably inhibited from moving further to the vehicle rear. Moreover, since the deformation (movement) direction of the hinge arm is restricted, even if the area of the front surface of front pillar base part is decreased, the hood hinge and the front hood can be reliably inhibited from moving to the vehicle rear.

According to the invention according to the third aspect, since the inflection point of the bent part is positioned below and in rear of the hinge axis, the deformation of the hinge arm caused by the shock load applied from the vehicle front via the front hood is induced in a portion below the hinge axis, and the hinge arm moving to the vehicle rear is guided reliably by the vertical surface of the cowl side panel or both of the vertical surface and the hinge base, so that the deformation direction is restricted further, and the deformation originating from the bent part of the hinge arm is accomplished definitely. Therefore, the deformed hood hinge strikes the front surface of front pillar base part reliably, and the hood hinge and the front hood can be reliably inhibited from moving further to the vehicle rear.

According to the invention according to the fourth aspect, since the weak part is formed in the bent part of the hinge arm, when a shock is applied from the vehicle front, the deformation of the hinge arm is induced with the weak part being the starting point of deformation, so that the movement of the hinge arm to the vehicle rear becomes further definite. Therefore, the hinge arm strikes the front surface of front pillar base part reliably, so that further movement is reliably inhibited.

According to the invention according to the fifth aspect, when a shock is applied from the vehicle front, the hood hinge (hinge arm) is guided while being in contact with the bead projectingly provided on the vertical surface of cowl side panel. Therefore, the friction at the contact time is kept low, so that the hinge arm is moved smoothly to the vehicle rear.

BRIEF DESCRIPTION OF THE DRAWINGS

FIG. 8 is a view taken in the direction of the arrow B in FIG. 7A; and

FIGS. 9A to 9C are views that are the same as FIG. 8, showing various examples of weak parts formed in a hinge arm.

DETAILED DESCRIPTION OF THE INVENTION

An embodiment of the present invention will now be described with reference to the accompanying drawings. The present invention is not limited to the embodiment described below, and various changes and modifications can be made without departing from the spirit and scope of the present invention.

Figure 1:
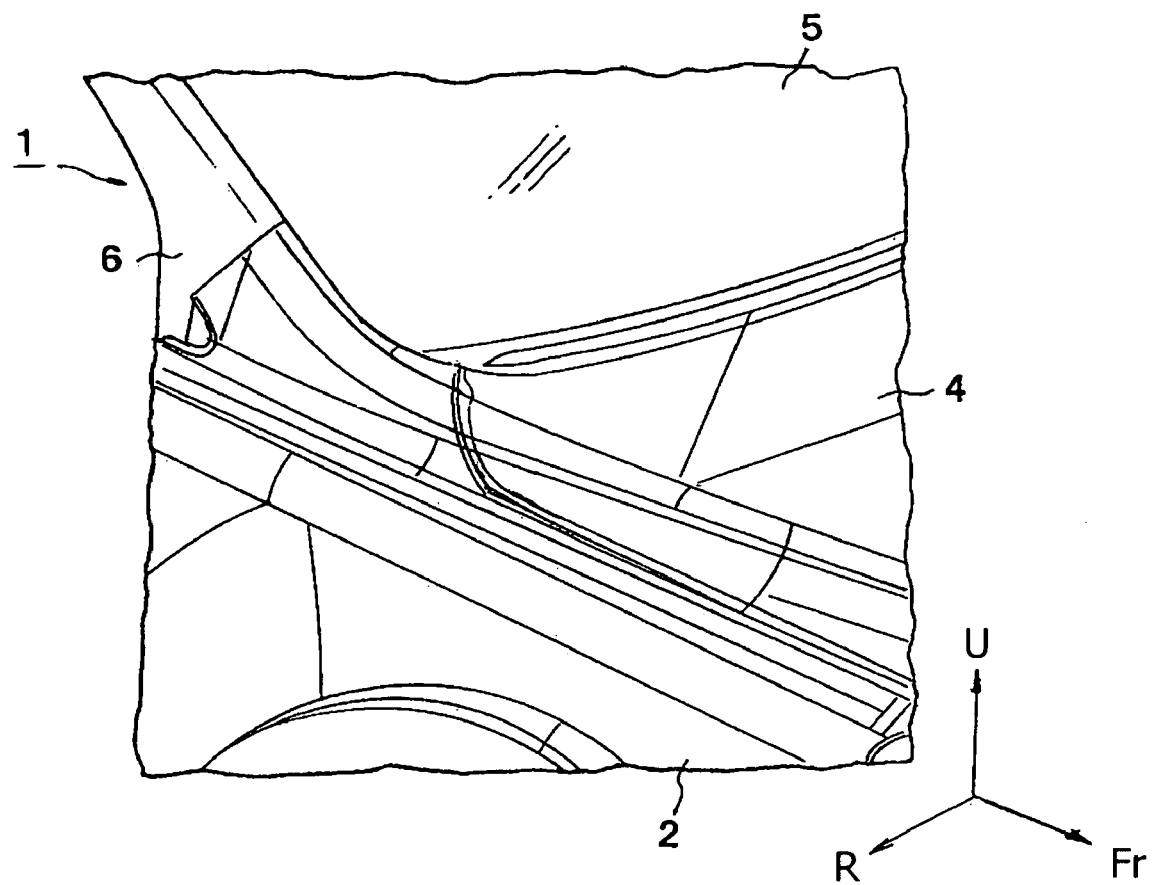
FIG. 1 is a partial perspective view of a vehicle front part to which a hood hinge arrangement structure in accordance with the present invention is applied.
Figure 2:
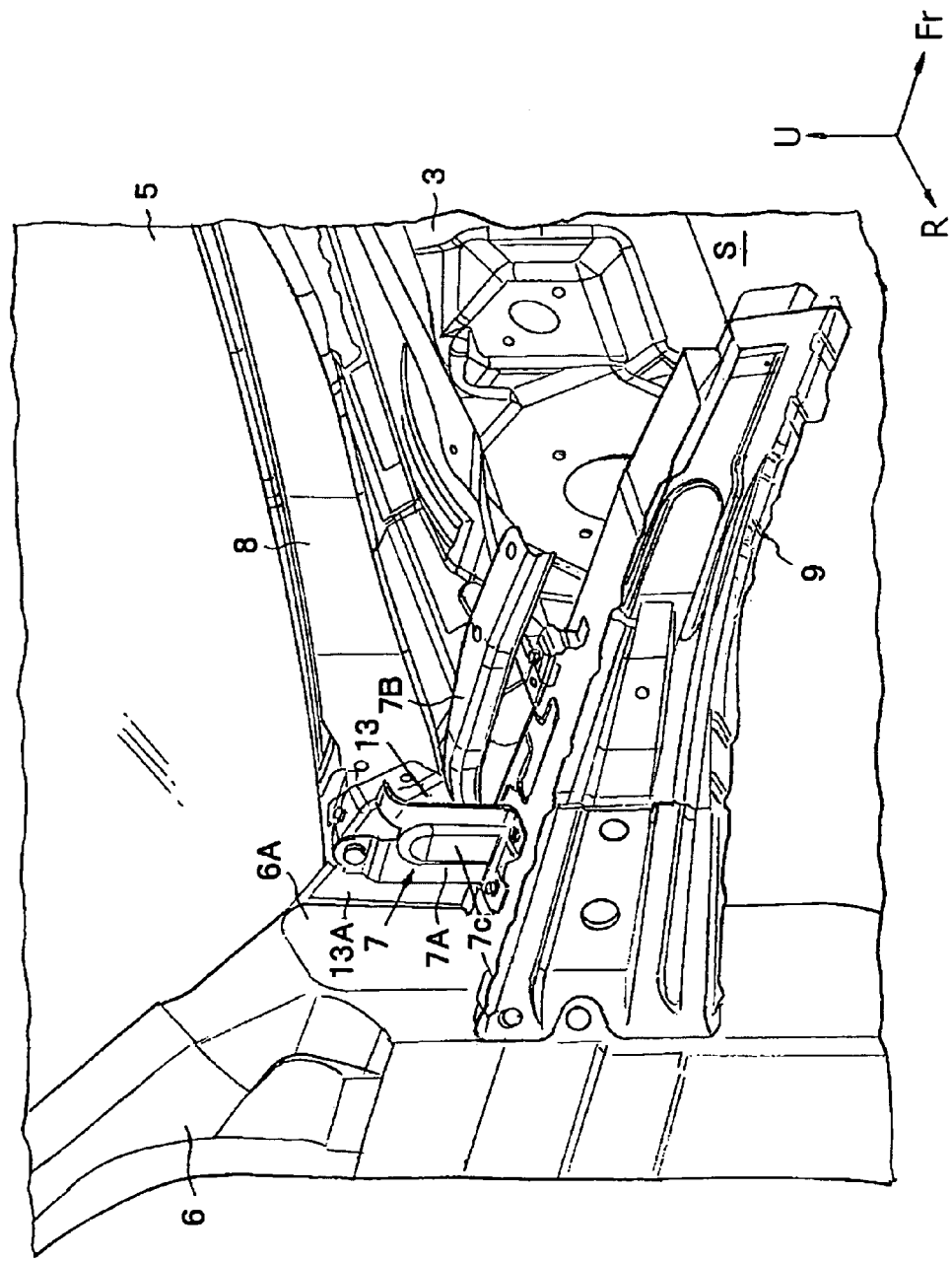
FIG. 2 is a partial perspective view of a hood hinge arrangement structure in accordance with the present invention, showing a state in which the front hood and the front fender shown in FIG. 1 are removed.

A vehicle 1 shown in FIG. 1 includes a rearward-hinged front hood 4 provided above an engine room S so as to be surrounded by right and left front fenders 2 (only one fender is shown in FIG. 1) and a dash panel 3 shown in FIG. 2. In the rear of the front hood 4, a windshield glass 5 is arranged, and on both sides of the windshield glass 5, side body outer panels 6 forming front pillars are arranged.

The rear end part of the front hood 4 is pivotally supported on a vehicle body by a pair of right and left hood hinges 7 (only one hood hinge is shown in the figures) shown in FIGS. 2 to 7. Each of the hood hinges 7 is made up of a hinge base 7A and a hinge arm 7B pivotally connected to the hinge base 7A via a hinge axis 10 (refer to FIG. 6). The hinge base 7A is fixed to the top end surface of a dash side front member 9 arranged at the side in the upper part of the dash panel 3, and the hinge arm 7B is attached to the lower surface in the rear end part of the front hood 4 in an end part extending to the opposite side to the hinge axis 10. To the upper part of the dash panel 3, a cowl box 8 extending in the vehicle width direction is joined. The cowl box 8 adopts a hollow structure the upper side of which is open, and to each side end in the vehicle width direction of the cowl box 8, a cowl side panel 13 for closing the side end is joined. The cowl side panel 13 extends above the dash side front member 9. The dash side front member 9 (also called an apron side upper member) is constructed by a dash side front panel, having a substantially U-shaped cross section that is open toward the side of the vehicle, and a cowl side outer panel, joined so as to close the opening of the dash side front panel, so as to extend in the vehicle longitudinal direction and have a closed cross section. The rear end of the dash side front member 9 is connected to the side body outer panel 6 integral with the front pillar.

Figure 4:
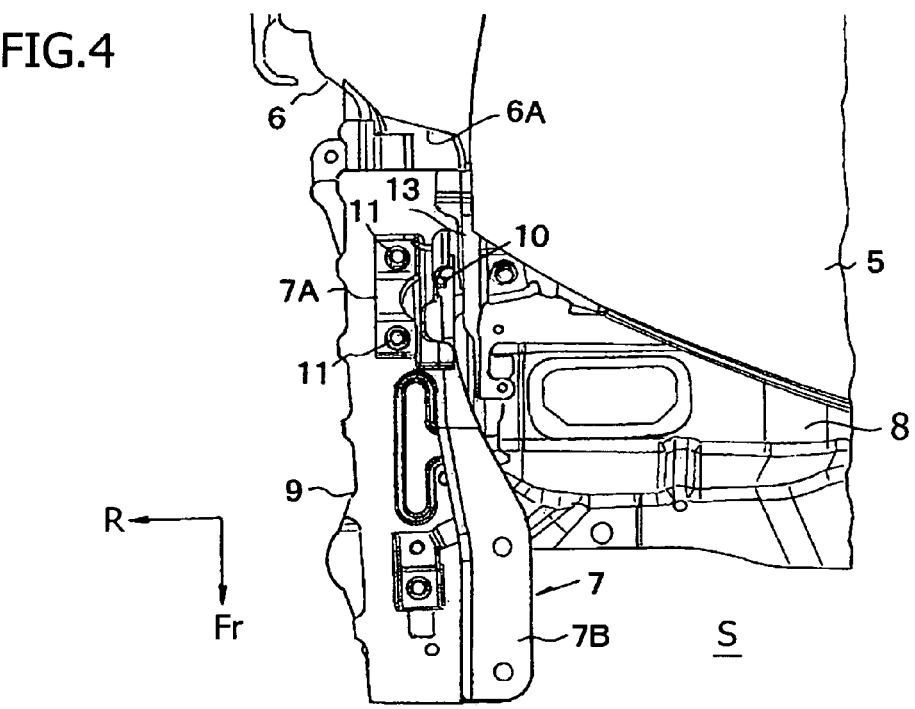
FIG. 4 is a partial plan view of a vehicular hood hinge arrangement structure.

As shown in FIGS. 2 and 4, the hinge base 7A includes a horizontal flange part 7a and a vertical part 7b erected vertically from the flange part 7a, and is fixed to the top end surface of the dash side front member 9 by the tightening of two bolts 11. Furthermore, the vertical part 7b of the hinge base 7A is formed with a bead 7c extending in the up and down direction. The bead 7c enhances the rigidity of the hinge base 7A so that the rigidity of the hinge base 7A is set higher than the rigidity of the hinge arm 7B.

Figure 3:
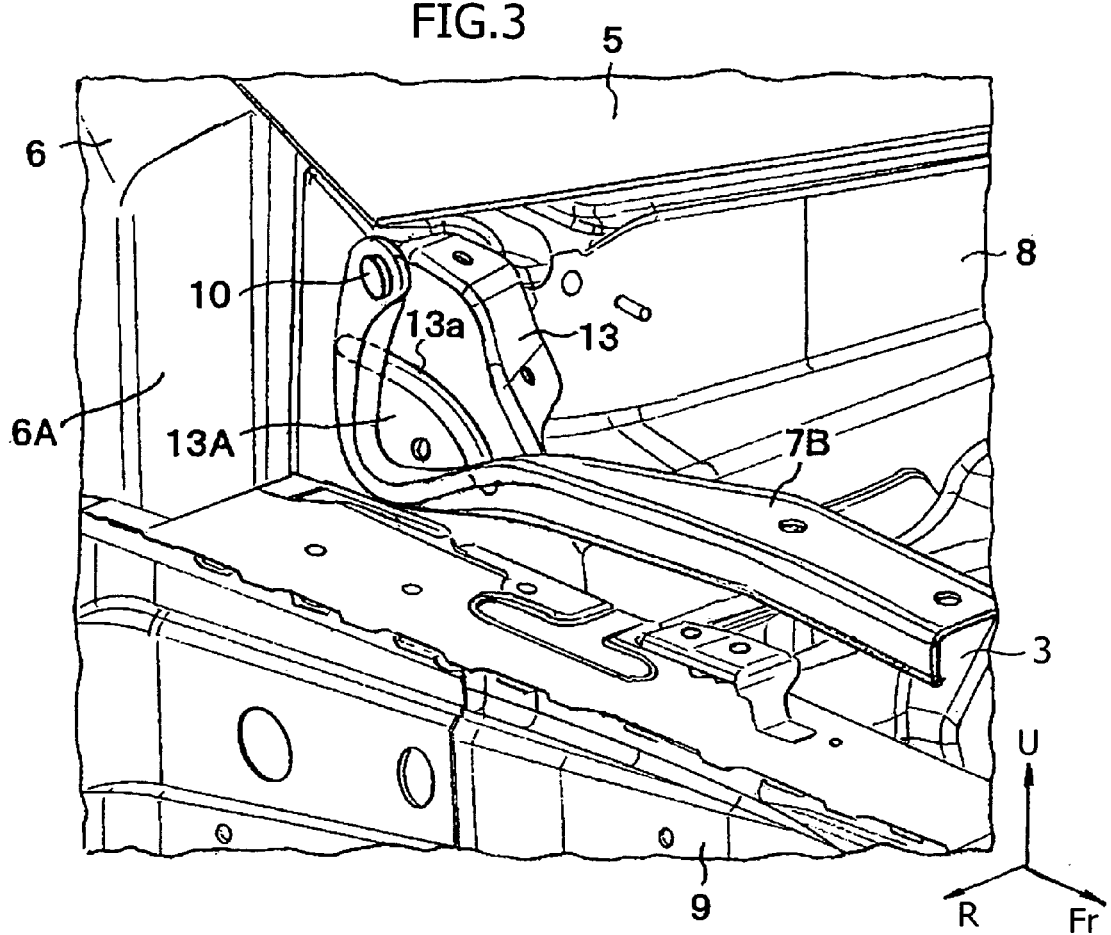
FIG. 3 is a partial perspective view in which a hinge arm and a cowl side panel are exposed, a hinge base being omitted.
Figure 5:
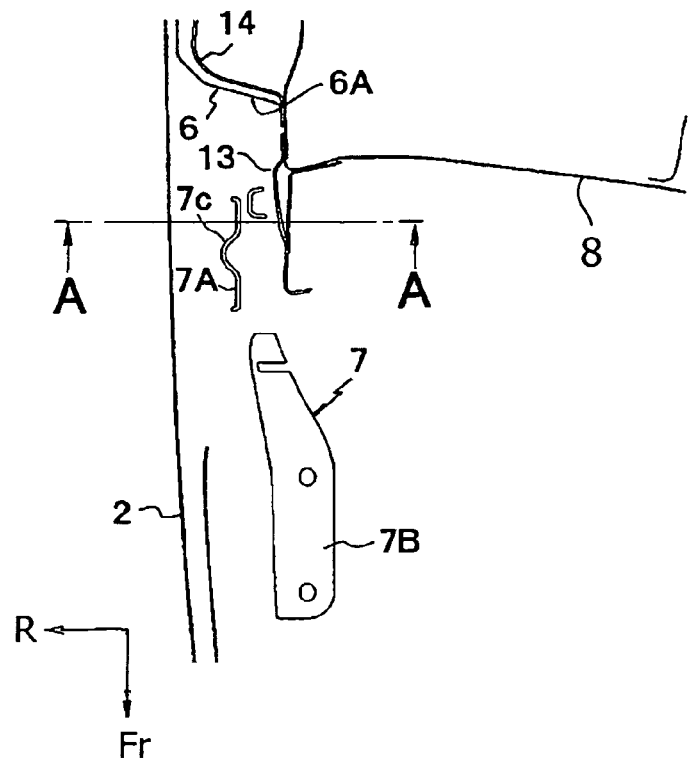
FIG. 5 is a partial sectional plan view of the vehicular hood hinge arrangement structure shown in FIG. 4.
Figure 6:
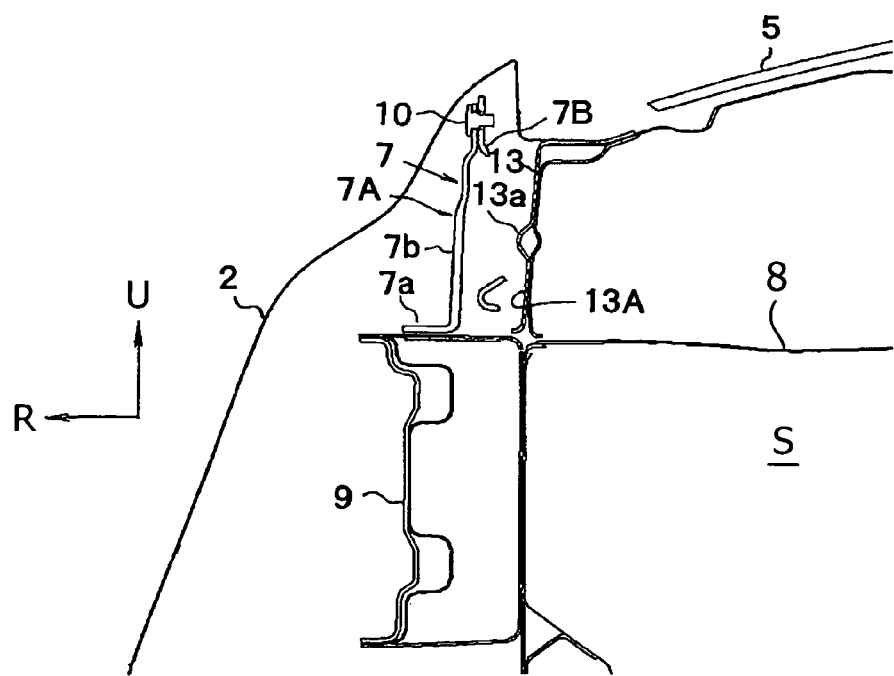
FIG. 6 is a sectional view taken along the line A-A of FIG. 5.
Figure 7A:
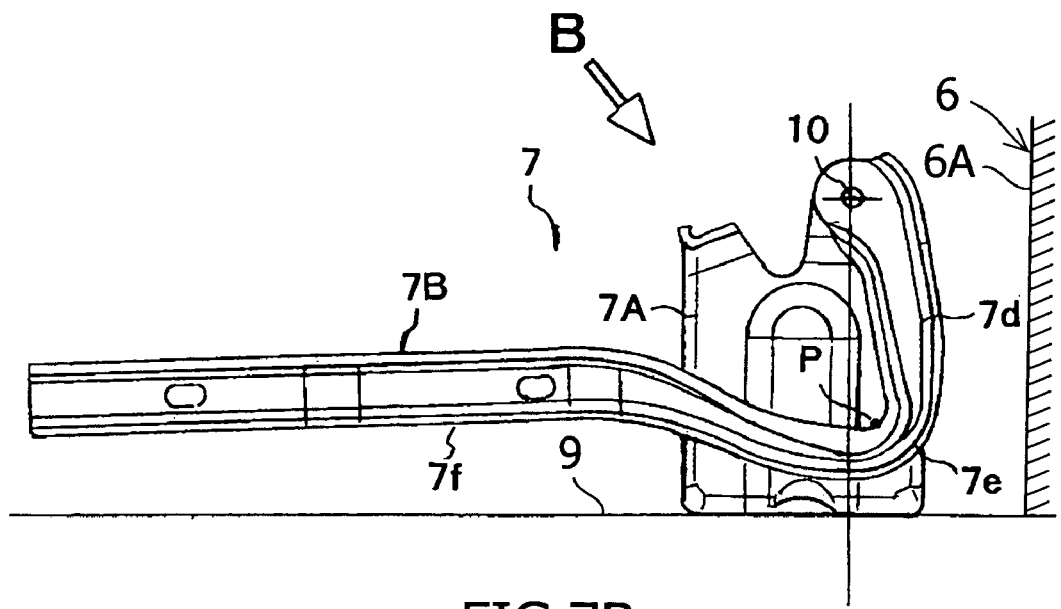
FIGS. 7A and 7B are side views showing states before and after the deformation of a hinge arm, respectively.

As shown in FIG. 7A, the hinge arm 7B is made up of a vertical part 7d extending downward from the hinge axis 10, a bent part 7e bent in a U shape from the lower end of the vertical part 7d toward the vehicle front side, and a horizontal part 7f extending horizontally from the bent part 7e further toward the vehicle front side. As shown in FIGS. 5 and 6, the hinge arm 7B is pivotally connected to the hinge base 7A by the hinge axis 10 part so as to be lapped thereon on the vehicle center side. The vertical part 7b and the bent part 7e of the hinge arm 7B each have flanges provided at both side edges so as to extend to the vehicle center side (the side on which the hinge base 7A is absent), and each are formed in a channel shape having a substantially U-shaped cross section. On the other hand, as shown in FIGS. 2 and 3, the horizontal part 7f of the hinge arm 7B is configured so that the flange at the upper side edge is expanded to the vehicle center side, and this expanded part serves as a mounting part for the front hood 4. Also, the inflection point P of the bent part 7e of the hinge arm 7B is positioned below and in the rear in the vehicle longitudinal direction of the hinge axis 10. The bent part 7e of the hinge arm 7B is formed so as to be thinner than the vertical part 7d and the horizontal part 7f, and is further formed with a notch 12 (section modulus suddenly changing part) as a weak part as shown in FIG. 8. As the weak part formed in the bent part 7e of the hinge arm 7B, in addition to the notch 12, a circular hole 12a as shown in FIG. 9A, a bead 12b formed in the direction crossing the hinge arm 7b as shown in FIG. 9B, a thin-wall part 12c as shown in FIG. 9C, or the like can be adopted.

As shown in FIGS. 2 to 6, the hood hinge 7 configured as described above is arranged adjacently on the outside in the vehicle width direction of the cowl side panel 13 (a vertical surface 13A) located at each end in the vehicle width direction of the cowl box 8, and is also arranged in front of a front surface 6A of the side body outer panel 6. As shown in FIG. 5, the front surface 6A of the side body outer panel 6 is reinforced by a front door hinge reinforcement 14 joined to the back side thereof. Inherently, the front door hinge reinforcement 14 is a member that is mounted on the side body outer panel 6 to reinforce the hinge mounting part of a front door of the vehicle. In the embodiment in accordance with the present invention, however, the front door hinge reinforcement 14 is extendingly provided on the back of the front surface 6A above the hinge mounting part for the reason described later, and further reaches a front pillar part at the side of the windshield glass 5, whereby the rigidity of the front surface 6A and the vicinity thereof is enhanced.

As described above, the hinge arm 7B is arranged on the center side in the vehicle width direction of the hinge base 7A. Therefore, the hinge arm 7B is arranged between the vertical surface 13A of the cowl side panel 13 and the hinge base 7A. Also, the bent part 7e of the hinge arm 7B is arranged in a region surrounded by the top end surface of the dash side front member 9, the vertical surface 13A of the cowl side panel 13, the hinge axis 10, and the hinge base 7A as viewed from the front side of vehicle (as shown in FIG. 6). As shown in FIG. 7A, the total length of the vertical part 7d and the bent part 7e of the hinge arm 7B (the distance from the hinge axis 10 to the inflection point P of the bent part 7e) is set longer than the distance between the hinge axis 10 and the front surface 6A of the side body outer panel 6 (or a clearance between the bent part 7e and the front surface 6A). As shown in FIGS. 3 and 6, the vertical surface 13A of the cowl side panel 13 is projectingly provided with a bead 13a extending substantially in the vehicle longitudinal direction.

The above is an explanation of the arrangement and construction of one (the right-hand side of the vehicle) of the paired hood hinges 7. The arrangement and construction of the other (the left-hand side of the vehicle) of the hood hinges 7 are basically the same (symmetrical in the right and left direction), so that the illustration and explanation thereof are omitted.

Figure 7B:
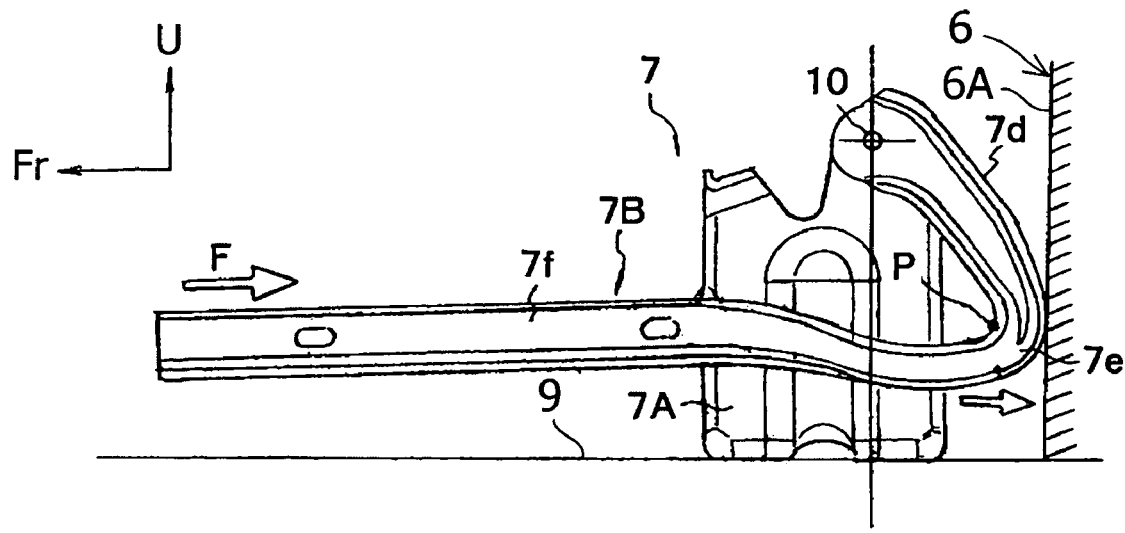

When the vehicle 1 having the above-described arrangement structure of the hood hinge 7 collides head-on, as shown in FIG. 7B, a shock load F directed from the front hood 4 toward the vehicle rear is applied to the hood hinge 7. Then, the bent part 7e of the hinge arm 7B of the hinge hood 7 moves to the vehicle rear while being deformed so as to bend as shown in FIG. 7B. In the present invention, however, since the hood hinge 7 is arranged in front of the front surface 6A of the side body outer panel 6 as described above, the bent part 7e of the hinge arm 7B comes into contact with the front surface 6A of the side body outer panel 6 as shown in FIG. 7B, so that further rearward movement can be inhibited. Since the side body outer panel 6 has a high rigidity, and moreover the front surface 6A of the side body outer panel 6 is reinforced by the front door hinge reinforcement 14 as described above (refer to FIG. 5), the hinge arm 7B and the front hood 4 integral therewith are reliably inhibited from moving further to the vehicle rear, whereby the front hood 4 can be reliably inhibited from colliding with the windshield glass 5.

Since the inflection point P of the bent part 7e of the hinge arm 7B is positioned below and in the rear in the vehicle longitudinal direction of the hinge axis 10, when the shock load F is applied from the vehicle front via the front hood 4, the deformation of the hinge arm 7B caused by the shock load F occurs below the hinge axis 10. In particular, in the mode in which the notch 12 is formed in the bent part 7e of the hinge arm 7B as a weak part, deformation originating from this notch 12 is induced, so that the hinge arm 7B moves to the vehicle rear definitely.

Since the hinge arm 7B is arranged between the hinge base 7A and the vertical surface 13A of the cowl side panel 13 as shown in FIGS. 4 to 6, the hinge base 7A and the vertical surface 13A of the cowl side panel 13 function as guide members with respect to the hinge arm 7B that is deformed and moved as described above, and the hinge arm 7B is moved to the vehicle rear in the state in which the movement thereof to the right and left is restricted by the guide members (7A and 13A). Thereby, the hinge arm 7B is deformed and moved (toward the front surface 6A of the side body outer panel 6) definitely, and is brought into contact with the front surface 6A of the side body outer panel 6, so that the hinge arm 7B and the front hood 4 integral therewith can be reliably inhibited from moving further to the vehicle rear.

In addition, in the mode in which the bead 13a extending substantially in the vehicle longitudinal direction is projectingly provided on the vertical surface 13A of the cowl side panel 13 as shown in FIGS. 3 and 6, when the shock load F is applied from the vehicle front as shown in FIG. 7B, the hinge arm 7B moving to the vehicle rear is guided while being in contact with the bead 13a, so that the friction at the contact time is kept low, and the hinge arm 7B is moved smoothly to the vehicle rear. Also, since the cross section of the hinge arm 7B is formed substantially in a U shape that is open to the opposite side to the hinge base 7A (a shape such as to have a surface on the hinge base 7A side), even in the case in which the hinge arm 7B is in contact with the hinge base 7A, the hinge arm 7B is moved smoothly to the vehicle rear.

What is claimed is:

1. A vehicular hood hinge arrangement structure comprising:
 a front hood;
 a pair of right and left hood hinges for pivotally supporting the rear end part of the front hood;
 a windshield glass arranged in rear of the front hood;
 right and left front pillars extending in the up and down direction along both sides of the windshield glass;
 a cowl box having a hollow structure, the upper side of which is open, which extends in the vehicle width direction along the lower edge of the windshield glass under the rear end part of the front hood;
 right and left cowl side panels defining the side end parts in the vehicle width direction of the cowl box so as to close the side end parts; and
 right and left dash side front members provided at the sides of the cowl box, wherein
 each of the cowl side panels has a vertical surface extending above the dash side front member and extending in the vehicle longitudinal direction;

each of the front pillars has a front surface, which extends upward almost vertically from the rear end part of the dash side front member, in the base part thereof; and each of the hood hinges is attached to the top end surface of the dash side front member so as to be located adjacent to the outside in the vehicle width direction of the vertical surface of the cowl side panel and in front of the front surface of the front pillar base part.

2. The vehicular hood hinge arrangement structure according to claim 1, wherein the hood hinge comprises a hinge base and a hinge arm, the hinge base is fixed to the top end surface of dash side front panel and has a rigidity higher than that of the hinge arm, and the hinge arm is pivotally connected to the center side in the vehicle width direction of the hinge base via a hinge axis, and the end part thereof extending to the opposite side to the hinge axis is connected to the rear end part of the front hood, thereby the hinge arm being arranged between the vertical surface of the cowl side panel and the hinge base.

3. The vehicular hood hinge arrangement structure according to claim 2, wherein the hinge arm comprises a vertical part extending downward from the hinge axis; a bent part bent in a U shape from the lower end of the vertical part toward the vehicle front; and a horizontal part extending horizontally from the bent part toward the vehicle front and attached to the rear end part of the front hood, the inflection point of the bent part being positioned below and in the rear of the hinge axis.

4. The vehicular hood hinge arrangement structure according to claim 3, wherein a weak part is formed in the bent part of the hinge arm.

5. The vehicular hood hinge arrangement structure according to any one of claims 2, wherein a bead extending in the vehicle longitudinal direction is projectingly provided on the vertical surface of the cowl side panel.

* * * * *